March 26, 1935.  G. A. LYON  1,995,392
TIRE COVER
Original Filed Oct. 25, 1929
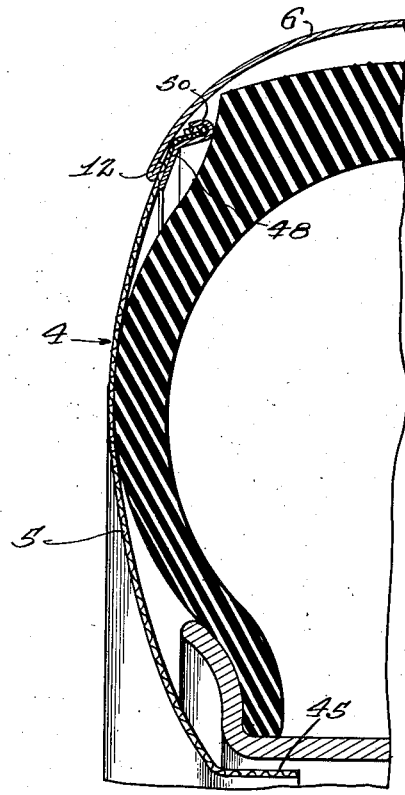
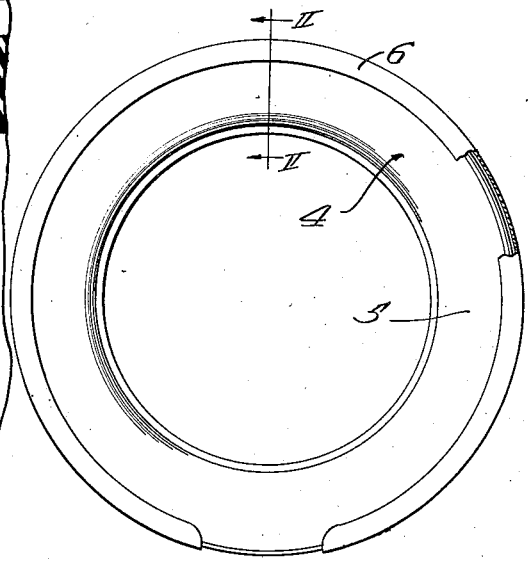
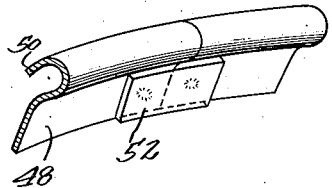
Inventor
George Albert Lyon
by Charles W. Hills
Attys.

Patented Mar. 26, 1935

1,995,392

UNITED STATES PATENT OFFICE 1,995,392

TIRE COVER

George Albert Lyon, Asbury Park, N. J., assignor to Lyon Incorporated, Asbury Park, N. J., a corporation of Delaware Original application October 25, 1929, Serial No. 402,361. Divided and this application September 9, 1932, Serial No. 632,424

6 Claims. (Cl. 150—54)

This invention relates to covers for spare tires of automobiles and constitutes divisional subject matter taken from my copending patent application Serial No. 402,361, filed October 25, 1929 pertaining to "Covers for spare tires of automobiles and method of making the same".

Certain tire covers which have been devised for spare tires consist of a casing made of sheet metal and arranged to extend about the periphery of the tire and over the outer side surface of the tire. Such covers are highly satisfactory where the spare tire is mounted on the car in position in which the cover is not liable to be struck by another car. This is the case where the spare tire is mounted in a well on the running board or where the car is protected at the rear by a bumper extending completely across the car at the rear of the tire carrier. These covers, however, when mounted upon spare tires located in the car in a position such that the cover is exposed to contact by another car often become permanently distorted and bent out of shape by contact of another car therewith. This is particularly true where the tire cover is applied to a spare tire mounted on a tire carrier at the rear of the car having bumperettes extending merely across the rear of each rear fender and leaving the spare tire exposed. It is common practice when the cars are parked in crowded spaces for one car to push another car by the contact of the bumper of the first car with the bumperettes or spare tire at the rear of the forward car. Certain of these bumpers have projecting clips and projecting ends along their central portions which extend between the bumperettes and will make contact with the tire cover before the bumper and bumperettes engage. This often will permanently dent a sheet metal side cover even when it is made of resilient metal.

The primary objects of the present invention are to improve the construction of covers for spare tires of automobiles and to produce a cover which is much more attractive in appearance than the ordinary fabric cover and in which the portion thereof covering the side surface of the tire will not become permanently bent nor distorted by contact of another car or other objects therewith.

Still another object of the invention is to provide a spare tire side covering member made of fabric or the like with reinforcing rings for aiding in preventing the radial collapse of the side covering member when it is removed from the tire and for facilitating the centering of the side covering member on the tire in the application of the cover to the tire.

Other objects and advantages will more fully appear from the following detail description taken in connection with the accompanying drawing which illustrates a single embodiment thereof and in which Figure 1 is a view in side elevation partly broken away illustrating the tire cover embodying the features of this invention;

Figure 2 is an enlarged fragmentary cross sectional view taken on substantially the line II—II of Figure 1 looking in the direction indicated by the arrows; and Figure 3 is a detail perspective view illustrating the construction of the reinforcing bead for the side covering member of the cover shown in Figures 1 and 2.

The tire cover as shown on the drawing is applied to a tire 2 supported on a rim 3.

In the form of the invention illustrated in the drawing the tire cover comprises a cover member 4 constructed to cover one side surface of a tire, and a cover member 6 constructed to extend about and cover the periphery of the tire. The cover member 4 comprises a body 5 formed of relatively thin flexible sheet material and preferably made of textile fabric coated upon one or both sides with a coating material which will give the coated fabric a glazed finished surface. This coating material should be of such character that it may be molded and preferably consists of material which is slightly softened by the action of heat. In actual practice flexible sheet fabric consisting of cotton drilling coated with a pyroxylin compound, and known in the art as "imitation leather", has been found to give highly satisfactory results. The cover member 4 may be made in the form of a ring as shown in the drawing, constructed to extend substantially from the periphery of the tire over the side surface to the inner margin or bead of the tire. This member, however, if desired, may be constructed to extend from the periphery of the tire to the axis of the tire and rim.

The side cover member 4 is preferably constructed to conform to a certain degree to the convex curvature of the side wall of the tire, and to this end, the flexible sheet material forming the body of said member is given a concavo-convex or other suitable form in cross-section. When flexible material, such as textile fabric coated with a moldable compound which is softened by the action of heat, is employed in the manufacture of the side cover member, said member may be readily molded into this cross-sectional shape by stretching the same over a suitably shaped form. This cover member may be molded by applying the same to a forming plate the outer surface of which, or a portion of the outer surface of which, has the form into which it is desired to mold the side cover member. To enable the molding operation to be efficiently performed the flexible fabric of the side cover member is preferably stretched tight on the reinforcing member before molding.

In the construction shown in Figure 2 the fabric of the side cover member is reinforced at its outer margin by means of a reinforcing ring 48, preferably made of strip steel provided with a coating to protect the same from corrosion and having the form in cross-section illustrated in Figure 2. As shown in this figure, the body of the ring 48 is so formed that it lies at an angle to the axis of the tire and rim substantially the same as the inclination of the marginal portion of the cover member which overlaps the side cover and at its outer margin, this ring is provided with an outwardly turned reversely bent flange indicated at 50. The marginal portion of the fabric 5 is folded back outwardly upon the body of said fabric, and this folded margin is inserted between the body of the reinforcing ring and reversely bent flange 50. The reversely bent flange is pressed down forcibly upon the fabric so that the fabric is gripped securely between the body of the ring and the edge of said flange.

The side cover member and peripheral cover member are applied to the tire in such a way that the peripheral cover member overlaps the outer margin of the side cover member in the manner shown in Figure 2 and contacts with that part of the fabric which extends across the outer surface of the body of the reinforcing ring. Thus there will be no metal to metal contact between the peripheral cover member and the side cover member.

Figure 3 shows the form of the reinforcing ring before the application of the fabric thereto. As shown in this figure, there is a considerable gap between the edge of the reversely bent margin 50 and the body of the ring, so that the folded margin of the fabric may be readily inserted between the body of the ring and the reversely bent margin. After the insertion of the fabric the reversely bent margin of the ring is bent down into contact with the fabric to hold the same securely in place.

The reinforcing rings 48 are made from strip steel of the desired thickness and are provided with a coating to protect the same from corrosion, this coating being applied, of course, before the flexible sheet material is attached to the ring. The rings are made from a continuous strip of steel of the desired thickness and are rolled into the desired cross-section and into spiral form in a rolling machine. The continuous strip is cut into sections after the rolling operation to form the individual rings. It is not essential to secure the split ends of each ring together since, after the fabric is attached thereto, the fabric will hold the ring in form. The ends of a ring may be secured together, if desired, by applying thereto a relatively small connecting plate 52, as shown in Fig. 3, which may be spot-welded to the ends of the ring. The fabric is preferably attached to the ring in two power press operations, in one of which the fabric is forced into the recess between the body of the ring and the reversely bent flange 50, and the flange is bent sufficiently to clamp partially the fabric, and in the second of which the flange is forced into position to grip the fabric securely.

The inner margin of the fabric 5 is preferably formed with a flange 45 extending at an angle from the body of the fabric. A flange of this form is produced in the molding of the side plate. As shown in Figure 2, the fabric flange 45 extends in a direction substantially parallel with the axis of the side cover member.

The member 6 of the tire cover which is constructed to extend about the periphery of the tire also has a concavo-convex form in transverse cross-section so as to fit over the periphery of the tire, the tread portion of the tire engaging in the concavity of this member. The cover member 6 is so constructed to extend transversely across the tread portion of the tire and to project for some distance beyond the tread portion as to margin. The member 6 is applied to the tire outside of the side cover member 4 and one margin thereof is arranged to overlap and contact with the peripheral portion of the side cover member, and the other margin to engage the tread surface of the tire along one side of the tread. The marginal portions of the cover member 6 are preferably turned back upon the body thereof, as indicated at 12, to form rounded edges.

The member 6 is made in the form of a divided ring and is also preferably formed so that the end portions thereof are separated by a space when said member is applied to a tire as shown in Figure 1. This member is constructed of a diameter somewhat less than the outside diameter of the tire to which it is to be applied and is made of resilient material having a degree of flexibility so that it may be bent in applying the same to the tire and the resiliency of the material will cause said member to contract upon the tire when released after the application thereto.

The member 6 may be formed from a strip of sheet metal stock, preferably sheet metal and may be given substantially the shape shown on the drawing by cold rolling. A cold rolling operation will give this member the required degree of resiliency and said member, upon contraction, will grip the tire securely.

In applying the tire cover to a tire, the side cover member 4 is first applied to one side surface of the tire, and the peripheral cover member 6 is then placed over the tire so that it overlaps the side cover member on one side of the tire and the side wall of the tire on the other side thereof. In applying the member 6, said member is expanded and upon its release, the resiliency of the material will cause the same to contract forcibly upon the tire thereby gripping the tread surface of the tire along one side of the tread and the peripheral portion of the side cover member. In gripping the side cover member the peripheral cover member engages the fabric at the points where the fabric extends over the outer face of the reinforcing ring 48. By the contracting action of the peripheral cover member, both members of the tire cover will be securely held in position upon the tire.

Now, it is of course to be understood that while I have illustrated and described in detail the preferred embodiment of the invention, the invention is not to be thus limited but only insofar as defined by the scope and spirit of the appended claims.

I claim as my invention:

1. In a spare tire cover, a pliable ring-like substantially form-retaining member for disposition over an outer side wall of a spare tire and formed to transversely conform with the curved contour of the side wall of the tire, and a metallic bead receiving and reinforcing the outer peripheral margin of said member, said bead being formed to lie inwardly of the outer side wall of the tire and be disposed adjacent the tread of the tire.

2. In a spare tire cover, a pliable ring-like substantially form-retaining member for disposition over an outer side wall of a spare tire and formed to transversely conform with the curved contour of the side wall of the tire, and a metallic bead receiving and reinforcing the outer peripheral margin of said member, said bead being formed to lie inwardly of the outer side wall of the tire and be disposed adjacent the tread of the tire, said ring-like member having its inner marginal edge provided with a laterally and inwardly extending marginal portion for disposition inwardly of the tire adjacent the tire bead.

3. A cover for a spare tire of an automobile, comprising, in combination, a section of flexible sheet material for covering one side of the tire, and a reinforcing ring of strip material enclosing and secured to a margin of said section, said ring having its outermost portion offset laterally therefrom toward the tire so as to receive and hold said margin of the section adjacent the tire tread.

4. In a tire cover, a pliable ring member formed for disposition over only a side of the tire and having its outer peripheral edge formed to extend inwardly toward and substantially up to the tread of the tire for frictional cooperation with another part of the tire cover, and a reinforcing ring receiving and secured to said edge, said ring having a portion arranged between the member and the tire to protect the member against frictional wear by the tire, said ring serving also to render said member substantially circumferentially rigid.

5. A cover for a spare tire of an automobile, comprising, in combination, a section of flexible sheet material for covering one side of the tire, a reinforcing ring of strip material enclosing and secured to a margin of said section, said ring having its outer face inclined inwardly toward the tire, said ring being offset inwardly toward the tire from the adjacent portion of the section so as not to interfere with engagement of the section with another part of the tire cover.

6. In a spare tire cover, a pliable ring-like substantially form-retaining member for disposition over an outer side wall of a spare tire and formed to transversely conform with the curved contour of the side wall of the tire, and a metallic bead receiving and reinforcing the outer peripheral margin of said member, said bead being formed to lie inwardly of the outer side wall of the tire and be disposed adjacent the tread of the tire, to facilitate centering of the member relative to the tire, said member having a laterally and inwardly extending inner marginal portion terminating within and substantially short of the median plane of the rim on which the spare tire is mounted, to enable the member to be used with spare wheels as well as with wheelless spare rims.

GEORGE ALBERT LYON.